(12) United States Patent
Roy et al.

(10) Patent No.: US 8,898,756 B2
(45) Date of Patent: Nov. 25, 2014

(54) SYSTEM AND METHOD FOR PASSWORD RECOVERY

(71) Applicant: Applied Research Works, Inc., Palo Alto, CA (US)

(72) Inventors: Shaibal Roy, Palo Alto, CA (US); Subhendu Aich, Kolkata (IN); Pankaj Agrawal, Kolkata (IN); Rashmi Saha, Kolkata (IN); Amrita Pal, Kolkata (IN)

(73) Assignee: Applied Research Works, Inc., Palo Alto, CA (US)

( * ) Notice: Subject to any disclaimer, the term of this patent is extended or adjusted under 35 U.S.C. 154(b) by 0 days.

(21) Appl. No.: 13/682,753

(22) Filed: Nov. 21, 2012

(65) Prior Publication Data
US 2014/0143845 A1    May 22, 2014

(51) Int. Cl.
| | |
|---|---|
| *G06F 15/16* | (2006.01) |
| *G06F 21/60* | (2013.01) |
| *G06F 7/04* | (2006.01) |
| *G06F 17/30* | (2006.01) |
| *H04L 29/06* | (2006.01) |
| *G06F 11/30* | (2006.01) |

(52) U.S. Cl.
CPC ...................................... *G06F 21/60* (2013.01)
USPC .......... 726/5; 726/3; 726/4; 726/18; 713/189; 713/193

(58) Field of Classification Search
None
See application file for complete search history.

(56) References Cited

U.S. PATENT DOCUMENTS

| | | | |
|---|---|---|---|
| 7,191,466 B1 * | 3/2007 | Hamid et al. ...................... 726/3 |
| 7,809,130 B1 * | 10/2010 | Kalyadin et al. ................... 380/1 |
| 8,078,881 B1 * | 12/2011 | Liu ................................ 713/183 |
| 2006/0041932 A1 * | 2/2006 | Cromer et al. .................... 726/6 |
| 2007/0157032 A1 * | 7/2007 | Paganetti et al. .............. 713/193 |
| 2011/0107400 A1 * | 5/2011 | Shankaranarayanan et al. . 726/4 |
| 2012/0005747 A1 * | 1/2012 | Tribble ........................... 726/18 |

FOREIGN PATENT DOCUMENTS

| | | | |
|---|---|---|---|
| WO | WO 2004/036394 A1 | 4/2004 |
| WO | WO 2005/045550 A2 | 5/2005 |

* cited by examiner

*Primary Examiner* — Shin-Hon Chen
(74) *Attorney, Agent, or Firm* — Bryan E. Repetto

(57) ABSTRACT

A method and system for password recovery in computer applications is disclosed. Passwords in the same computer application may be recovered according to different criteria. Criteria for password recovery vary according to the sensitivity of the password-protected material. Criteria for recovery of a password protecting sensitive information have more stringent criteria than criteria for recovery of passwords protecting less sensitive information. In certain embodiments, passwords may be recovered through the use of third party agents. Recovered passwords are associated with unique identifiers, such as email addresses and phone numbers that facilitate communication with a user. Recovered passwords may be transmitted to users via email, phone, and text message or by any other means associated with the unique identifier.

19 Claims, 8 Drawing Sheets

US 8,898,756 B2

SYSTEM AND METHOD FOR PASSWORD RECOVERY

BACKGROUND

A username and password combination is a commonly used means through which the identity of a user of a computer application can be established with reasonable certainty. Because most users have multiple username and password combinations and may use certain applications infrequently, many users have a frequent need to recover or reset passwords. An effective and secure means to recover lost or forgotten passwords is necessary in many computer applications.

Any successful means through which a user can recover a password, must overcome numerous challenges. First, the security and integrity of the application, and the data residing on any server that may be accessed, must be protected. This is especially true when the password to be recovered can provide access to sensitive information such as medical records, financial records, trade secrets, or permissions to alter such data. Second, any means by which a new password is supplied to a user must ensure the user is the intended recipient of the new password. Finally, any means through which a user can recover a password should require a sufficient degree of authentication.

BRIEF SUMMARY

Disclosed, is a system and method for recovery of passwords for computer applications. Each user in the system has one or more accounts. Each account and user is associated with at least one unique identifier. The unique identifiers may be a phone number, email address, or username on an electronic messaging service. In addition to establishing identity, the unique identifiers are also means through which users are contacted.

Certain embodiments of the system and method disclosed include differing criteria for the recovery of passwords. Unique identifiers can be classified as Valid, Invalid, or Verified. A classification of Verified is the highest classification a unique identifier can hold. Passwords protecting sensitive information or sensitive privileges can only be recovered when the unique identifier associated with the account is Verified. Unique identifiers are classified as Verified when a user inputs known demographic information into the system. To recover a password that protects information or privileges that are non-sensitive, a unique identifier must be classified as Valid or Verified. No password may be recovered if the unique identifier is classified as Invalid.

In certain embodiments, the recovered password is generated by a pseudo-random number generator. In alternative embodiments, the recovered password can be taken from a known list, or through other non-random methods.

Recovered passwords may be transmitted to users through the mode of communication associated with the unique identifier. For example, if the unique identifier is an email address, the recovered password can be transmitted to the user via email. If the unique identifier is a phone number, the recovered password can be transmitted to the user by audio message, voice mail, or text message.

In certain embodiments, a user can recover a password from an agent. Agents are either employees of the system administrator, or third parties outside the direct control of the system administrator. In such embodiments, an agent will verify the identity of the user. Once the user is identified, the agent may obtain a recovered password. The recovered password may then be given to the user or sent to the user using the unique identifier.

DETAILED DESCRIPTION

Figure 1:
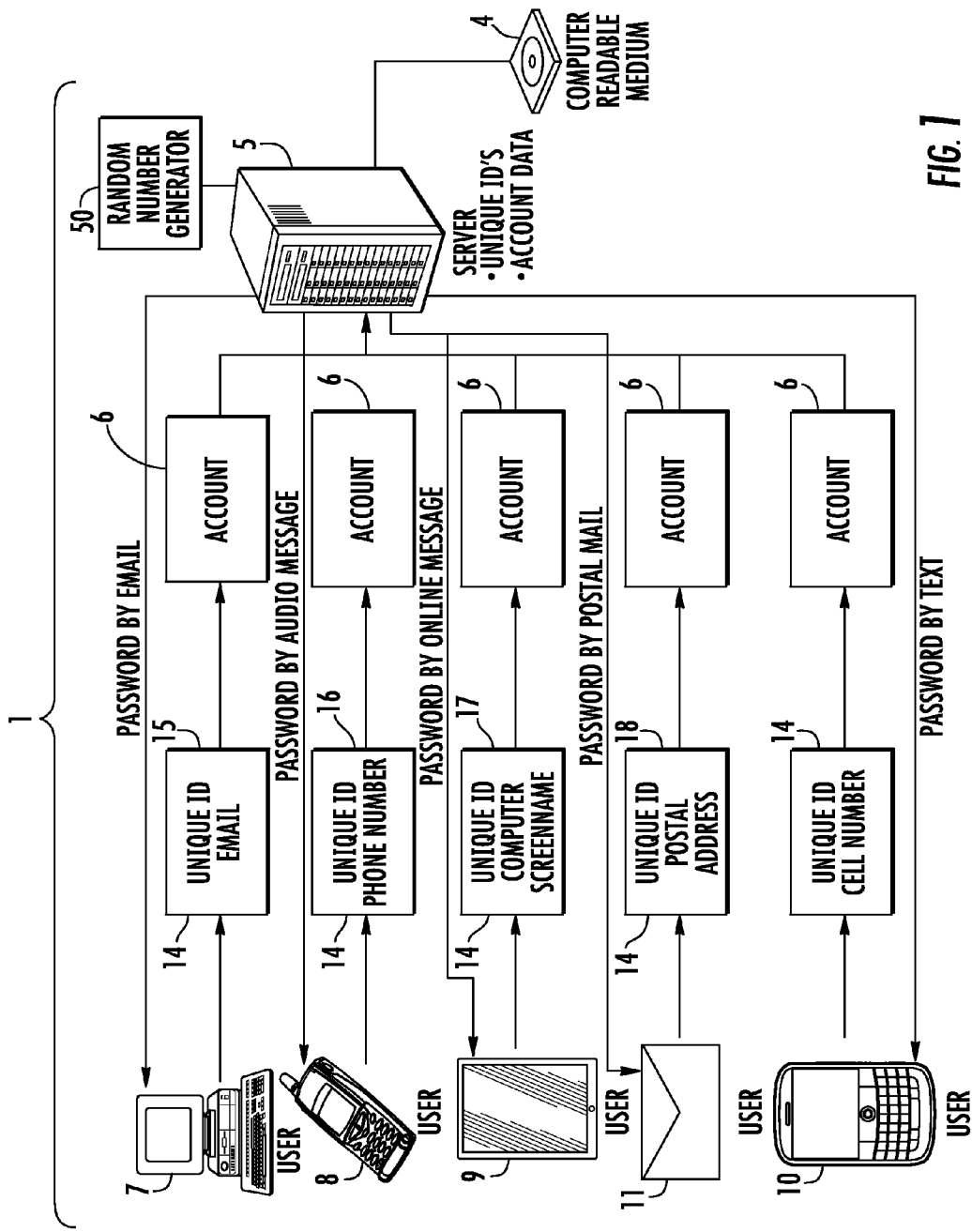
FIG. 1 is a diagram of an embodiment of a system through which a user can recover or obtain a password.
Figure 2:
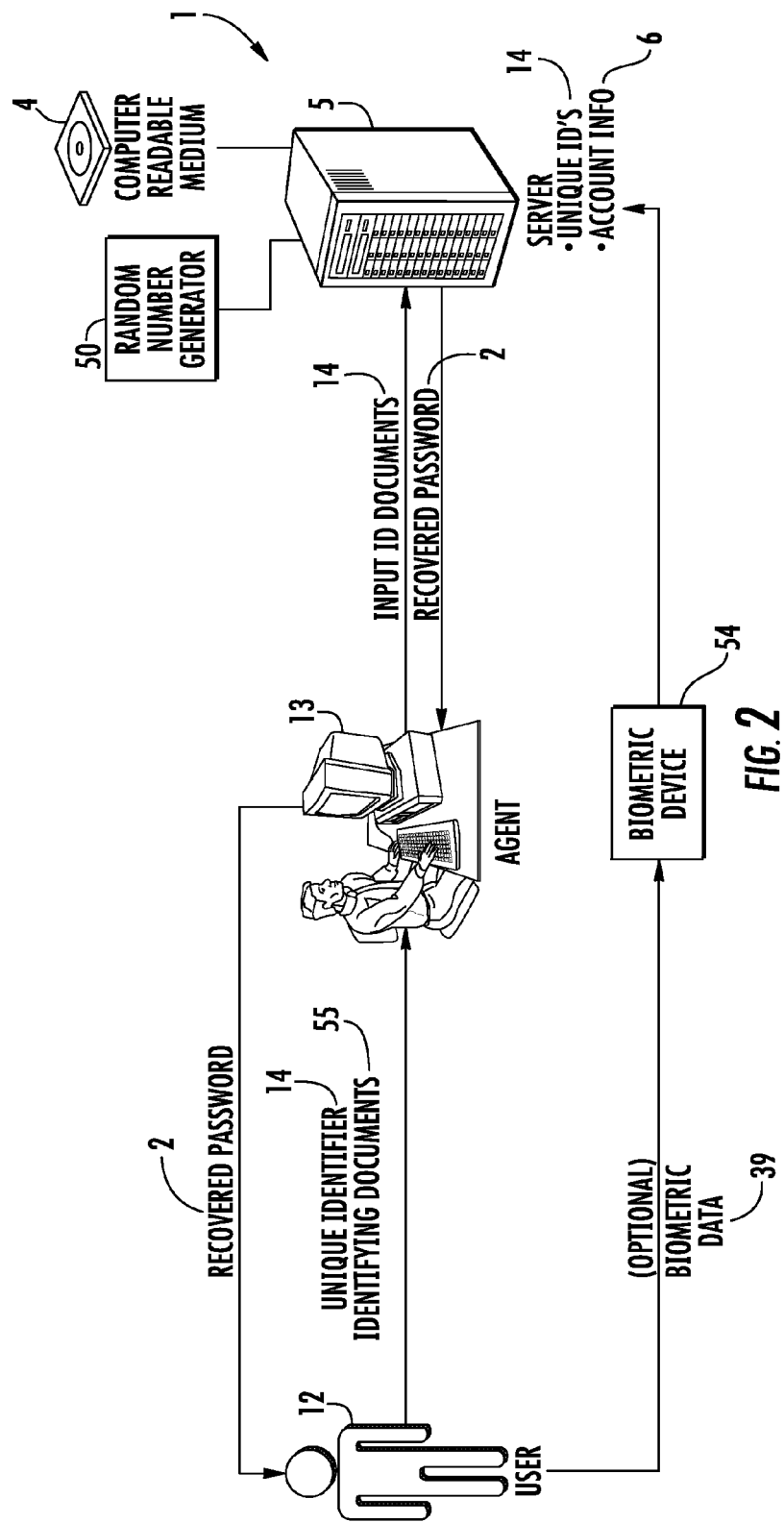
FIG. 2 is a diagram of an embodiment of a system through which a user can obtain a password through an agent.

Disclosed is a system 1 and methods for the recovery of a password 2 for a computer application 3. In certain embodiments, computer-readable instructions for performing the method may reside on a computer readable medium 4. The computer readable medium 4 is coupled to the system 1 and may reside on the system server 5. The system 1 is comprised of one or more servers 5 storing account 6 information. The system 1 also comprises computers 7, telephones 8, tablets 9, smartphones 10, and other communication devices 11 associated with users 12 and agents 13.

In a given system 1, comprised of many users 12, and each user having one or more accounts 6, each user 12 or account 6 has associated unique identifier 14. In some embodiments, the unique identifier 14 may be an email address 15, phone number 16, username 17 on an electronic messaging service, or mailing address 18. The unique identifier 14 may be any identifying information that can be used to contact the associated user 12. The unique identifier 14 is supplied to the system 1 when an account 6 is generated. An account 6 is generated when a user 12 registers to use the system 1. Users access the system through a user interface 19. In some embodiments, the user interface is accessed through a web browser 20. In other embodiments, the user interface may be another software application. Alternatively, an account can be generated when a third party registers the user 12 in the system. Examples of third parties that may enroll a user 12 in such a system include, but are not limited to, insurance providers, financial institutions, employers, internet service providers, and merchants.

After a user 12 has been registered, the system 1 will attempt to send a message to the user 12 by relaying a message by a means using the unique identifier 14. In embodiments wherein the unique identifier 14 is a phone number 16, the system will attempt to contact the user by voice message 22 or text message 23. In embodiments wherein the unique identifier 14 is an email address 15, the system 1 will attempt to contact the user via email 24. In embodiments wherein the unique identifier is a username 17 for an electronic messaging service, the corresponding electronic messaging service will be used by the system to attempt contact. In embodiments wherein the unique identifier is a mailing address 18, the system will attempt to contact the user via postal mail 25.

In certain embodiments during registration, the system 1 may ensure that the form of data entered as a unique identifier 14 is possibly valid by performing an initial screening of the data. If an email address 15 is entered as unique identifier 14, the system will ensure a "@" is present. If a phone number 16 in North America is entered as a unique identifier 14, the system 1 may ensure the number is comprised of ten numeric digits.

There are three possible states 26 in which the system 1 may classify each unique identifier 14: Invalid 27, Valid 28, and Verified 29. A unique identifier 14 will be classified as Invalid 27 if the system 1 receives an indication that a message 30 sent, using the unique identifier 14 as a destination, was not received. In certain embodiments, a classification of Invalid 27 will occur when an email 24 is bounced back to its originating server 5, a text message 23 is undeliverable, a voice message 22 cannot be delivered to a specified phone number 16, a message cannot be delivered to a username 17 on an electronic messaging service, or a piece of postal mail 25 is returned to the sender. In embodiments where postal mail 25 is used, an individual person may input data into the system 1 indicating the piece of mail was returned as undeliverable.

A unique identifier 14 will be classified 31 as Valid 28 when a message 30 sent to a user 12 is known to reach the user 12. A message 30 is considered to be known to have reached the user when the system 1 receives no input that the message was not received. In an embodiment wherein the unique identifier is an email address 15, the email address 15 will be deemed to be Valid 28 when email 24 is not returned as a bounced message, and the system 1 does not receive a message indicating the email address is not functional. The email address 15 will be considered valid; unless and until, the system 1 receives an indication that the email addresses 15 is not valid.

After a unique identifier is classified as Valid 28, a unique identifier 14 will be classified as Verified 29 when the user 12 provides additional demographic data 31. The additional demographic data 31 is previously known to the system 1. In certain embodiments, the additional demographic 31 data may include a user's 12 social security number 32, credit card number 33, medical record number 34, insurance number 35, financial account number 36, date of birth 37, previous address 38, or any other unique data known to the system 1. In alternative embodiments, a unique identifier 14 can be Verified 29 when biometric data 39 associated with a user 12 is obtained. Biometric data 39 may include finger prints 40, retinal scans 41, facial recognition 42, or any other biometric data associated with a user 12. In such embodiments, a biometric recognition 1 device may be coupled to the system 1. In alternative embodiments, a unique identifier 14 can be classified as Verified 29 upon presentation of additional demographic data 31 or identifying documents to an agent in person. Upon presentation of demographic data 31 or identifying documents 44 to an agent in person, the agent will transmit the identifying information or information from identifying documents to the server. Data can be transmitted from the agent to the server electronically. Modalities for communication with the server may include Internet, telephony, or radio frequencies and may include computers, smartphones, or telephones.

In certain embodiments, password recovery protocols vary based on the sensitivity of the information the password protects. There are numerous applications in which password recovery protocols would vary based on sensitivity of data protected. For example, accounts 6 that contain sensitive data such as credit card information, social security numbers, or certain medical information warrant more stringent security standards than user accounts containing less sensitive information such as basic contact information. Other instances where varying security protocols are advantageous are at the enterprise level where user accounts for system administrators will have high level administrative functions, therefore warrant a higher security level, compared to user accounts for users with fewer privileges. Determination as to the sensitivity of account information is dependent on criteria selected by the system administrator. Those skilled in the art will appreciate that various embodiments can be implemented with varying criteria as to what account information constitutes Sensitive 46 and Non-Sensitive 47 data or privileges. Certain embodiments include a plurality of varying security protocols based on the content of the user account or the privileges associated with the user account.

In one embodiment, there are two classifications used to determine the level of security needed to recover a password. In such an embodiment, the system 1 includes an existing list of content and privileges on a user account 6 that is considered to be Sensitive 46 data. A user account 6 having sensitive data will be classified as Sensitive 46. User accounts 6 not having sensitive data will be classified as Non-Sensitive 47. A user having an account 6 classified as Non-Sensitive 47 may recover his password if his unique identifier 14 is classified as Valid 28. For users having accounts classified as Sensitive 46, a user must have a unique identifier 14 classified as Verified 29. In these embodiments, it is it is only appropriate for the system 1 to transmit a recovered password 1 to user 12 if the preceding conditions are satisfied. The system 1 will not transmit a recovered password 2 to a user 12 if the above conditions are not satisfied. In no event will a recovered password 2 be transmitted to a unique identifier 14 that is classified as Invalid 27.

Figure 3:
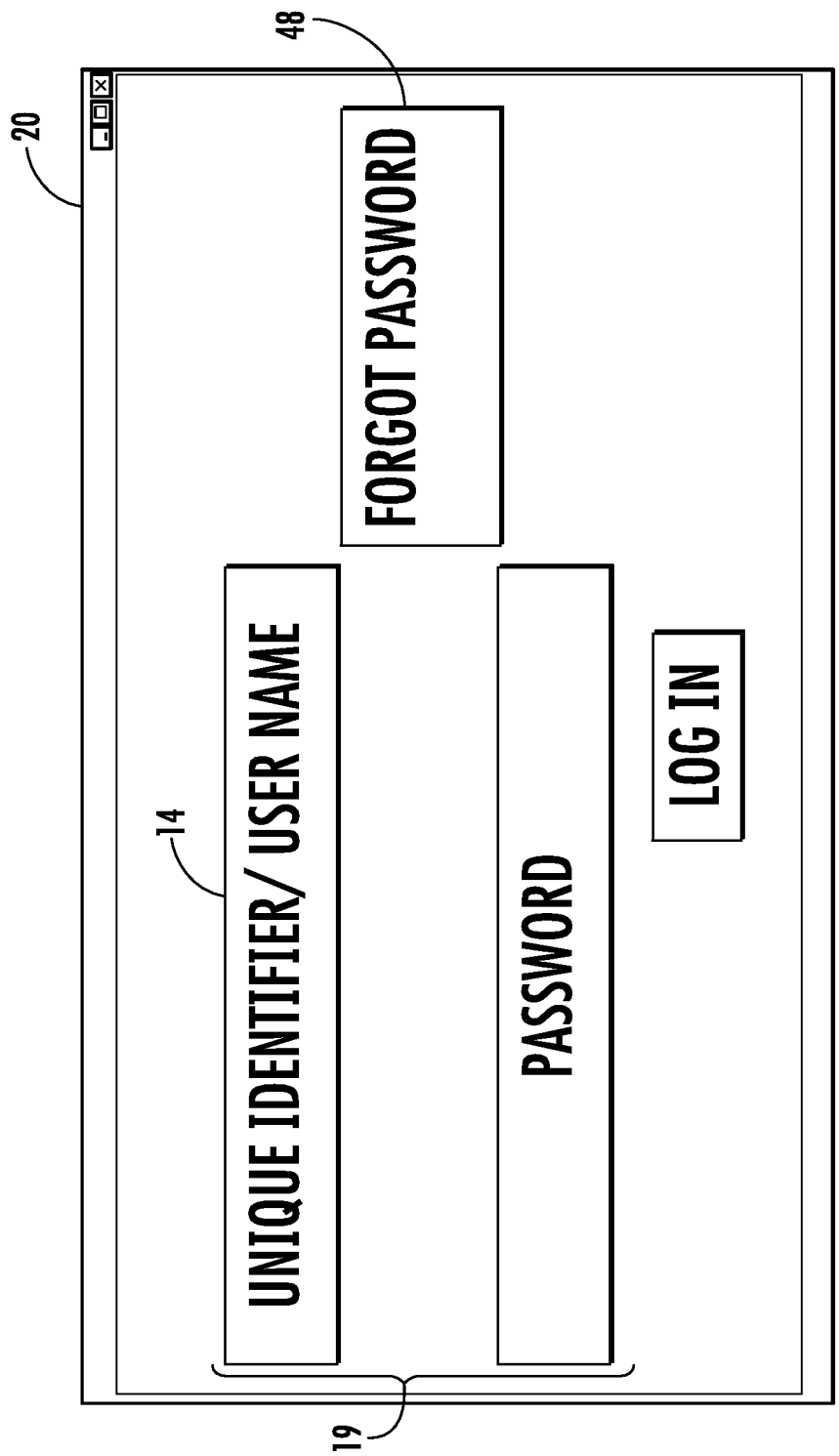
FIG. 3 is a diagram of an embodiment of a user interface through which a user can request a recovered password.
Figure 4:
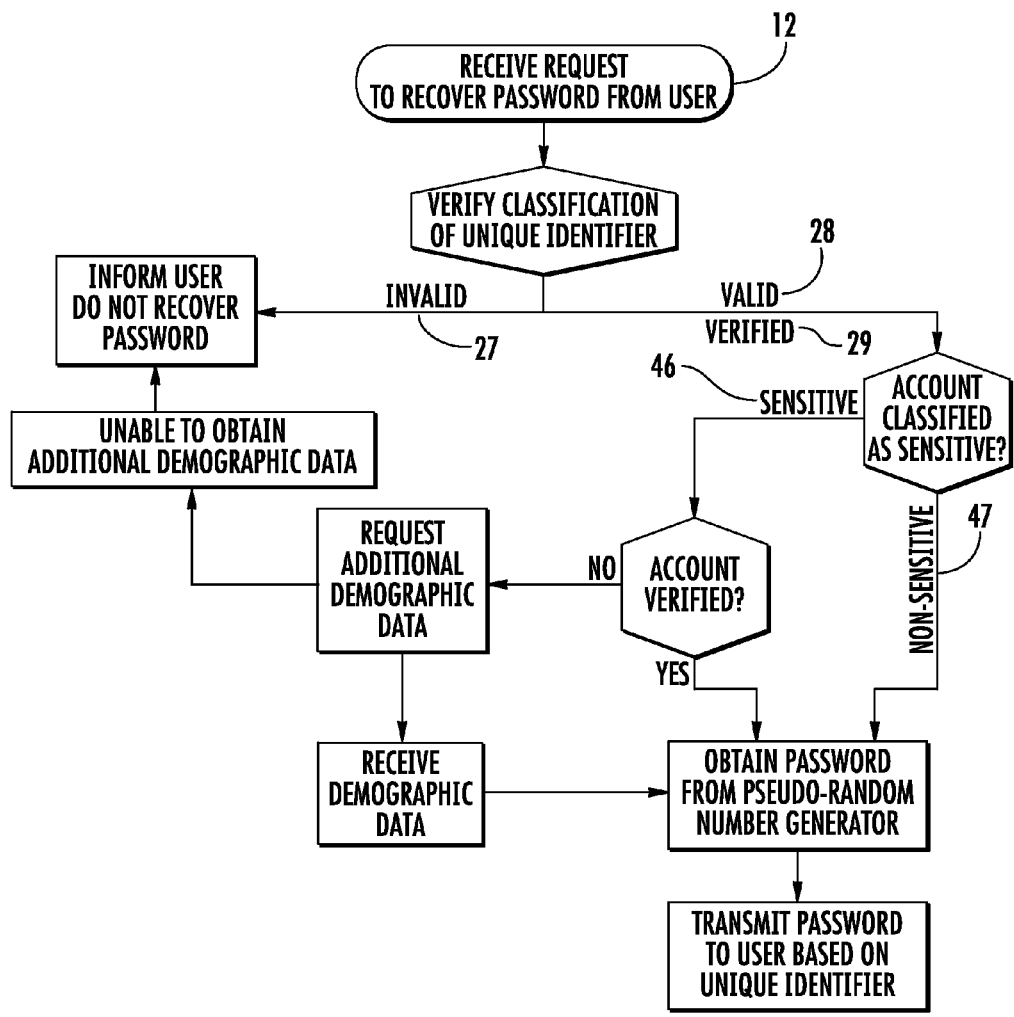
FIG. 4 is a flowchart illustrating an embodiment of a method through which a user can obtain or recover a password.
Figure 5:
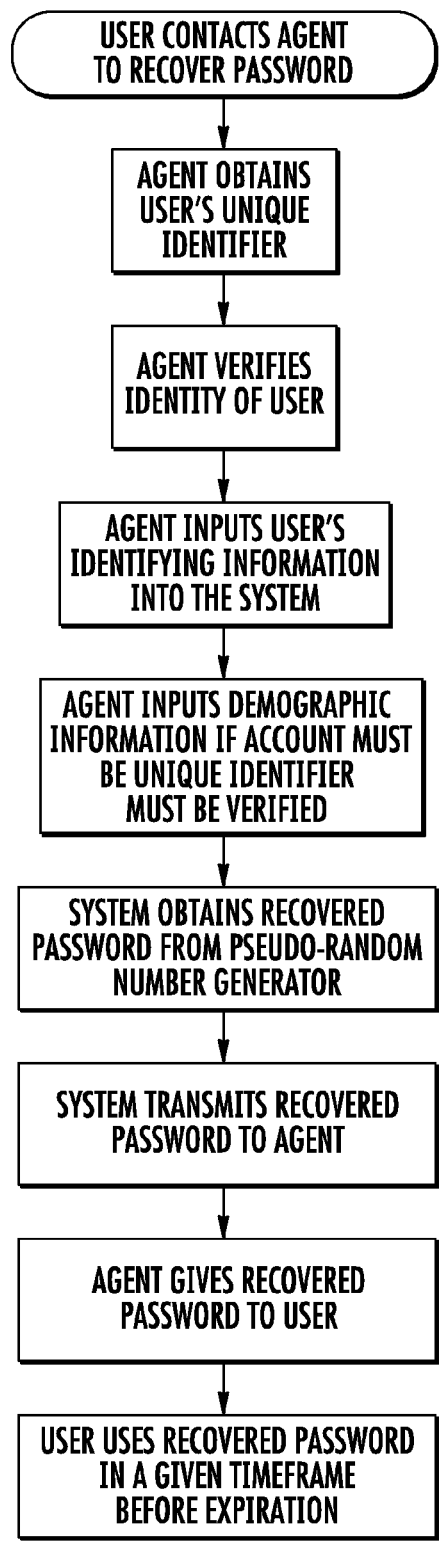
FIG. 5 is a flowchart illustrating an embodiment of a method through which a user can recover or obtain a password through an agent.
Figure 6:
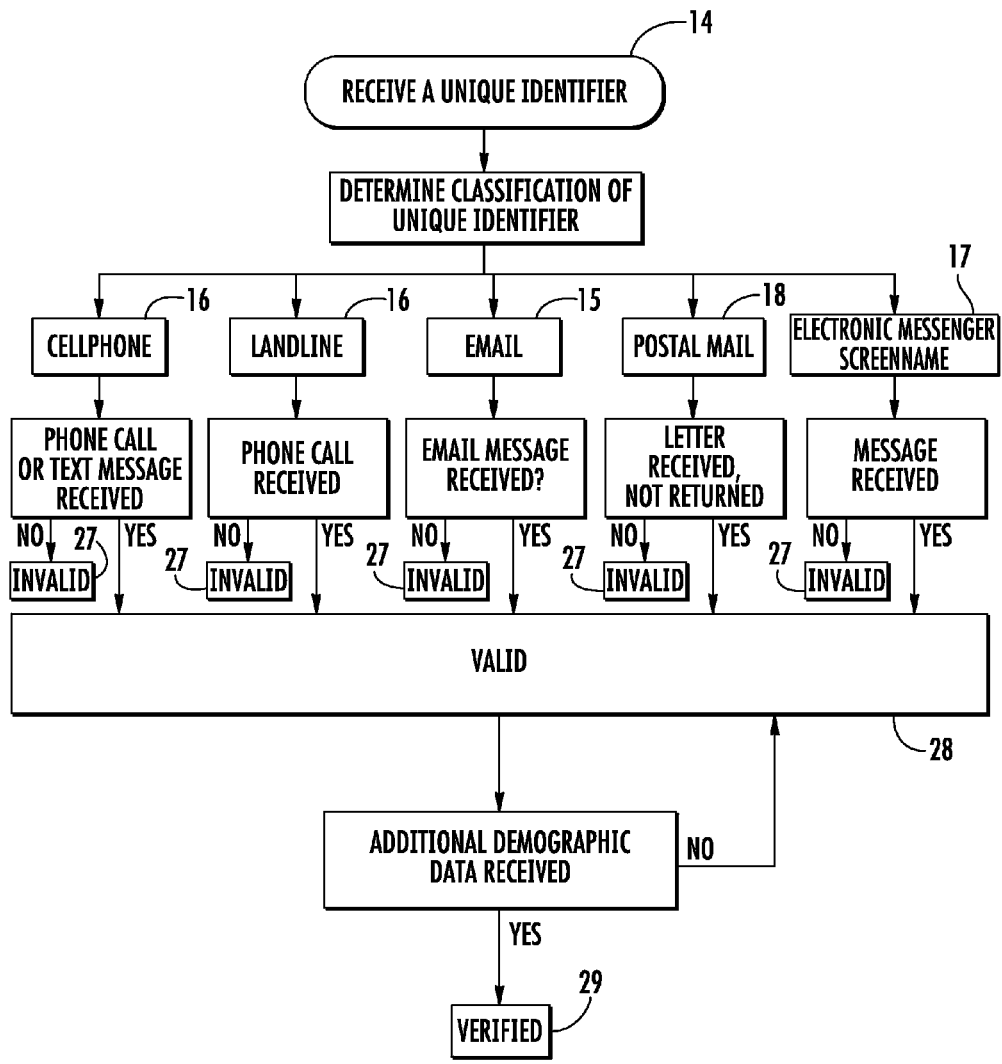
FIG. 6 is a flowchart illustrating an embodiment of a process for a system to determine the classification of a unique identifier.
Figure 7:
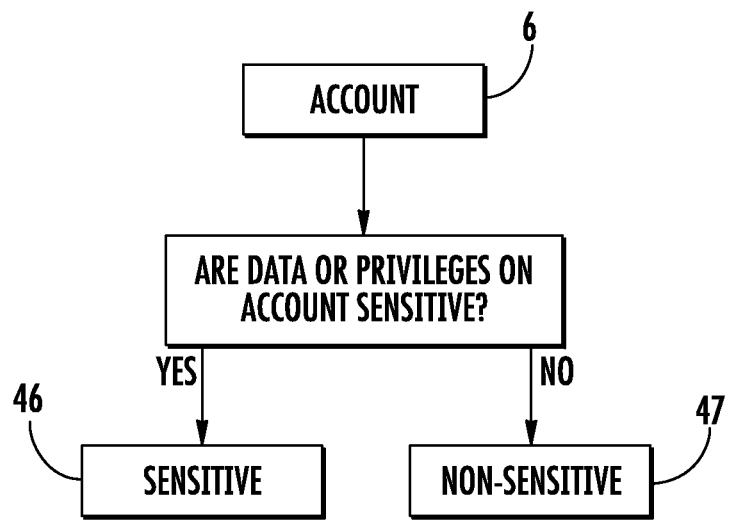
FIG. 7 is a flowchart illustrating an embodiment of a process for a system to determine the classification of an account.
Figure 8:
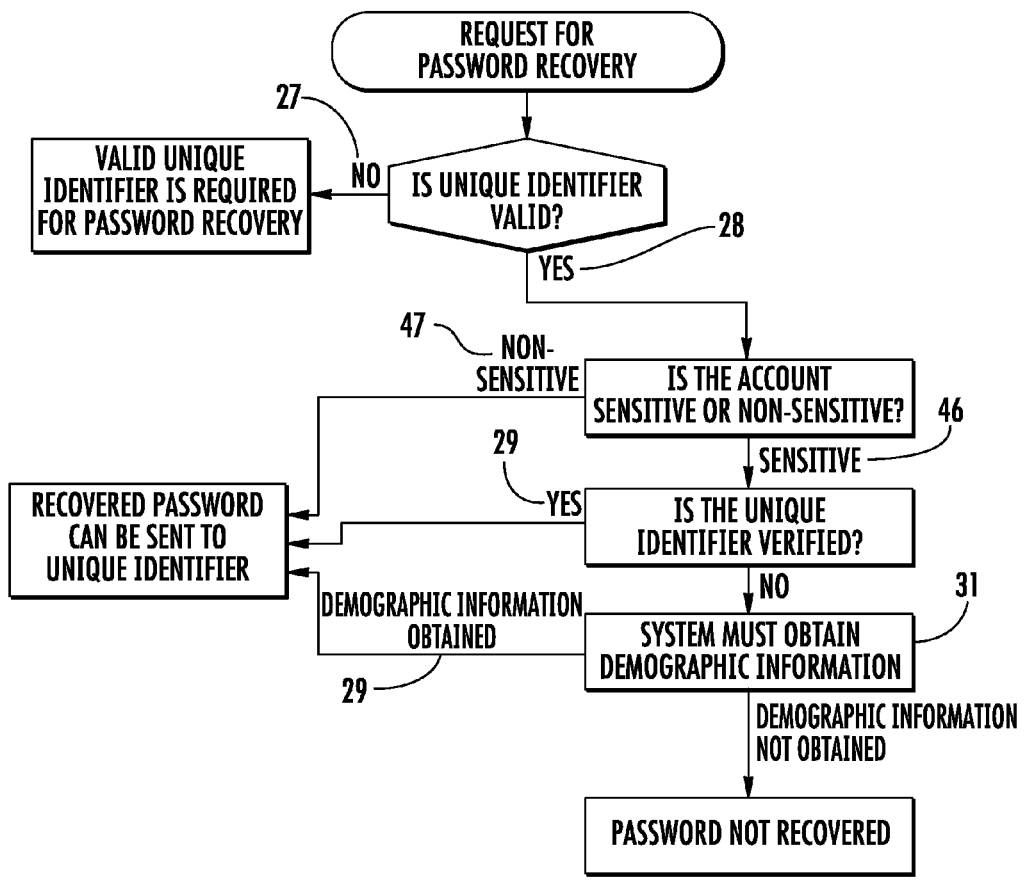
FIG. 8 is a flowchart illustrating an embodiment of a process for a system to determine whether additional information is needed before issuing a password.

When a user 12 recognizes a password needs to be recovered, the user will access a user interface 19. The user interface 19 is a computer interface accessed through a web browser 20 or software application 21, capable of communicating with a system server 5. The user 12 will then indicate a password needs to be recovered. In certain embodiments, this is achieved by clicking on a link or button 48 labeled "recover password", "forgot password", or similar language, as depicted in FIG. 3. The user 12 will then be directed to enter his unique identifier 14. The system 1 will then verify the unique identifier 14, the classification 49 of the account (Sensitive 46 or Non-sensitive 47), and the classification of the unique identifier 14 (Valid 28, Invalid 27, Verified 29). If the unique identifier is classified Invalid 27, the system 1 will inform the user 12, through the user interface 19, that the password cannot be recovered. If the unique identifier 14 is classified as Valid 28 and the account 6 is classified as Sensitive 46, the system 1, through the user interface 19, will inform the user 12 that the password 2 cannot be recovered. In such an instance, the user 12 may be directed to contact the system administrator.

Recovered passwords 2 are generated by a pseudo-random number generator 50. In alternative embodiments, recovered passwords may be generated by non-random algorithms or pre-existing lists. If a unique identifier 14 is classified as Valid 28 or Verified 29 and the account 6 is classified as Non-sensitive 47, the system 1 will supply a recovered password 2. If the unique identifier is classified as Verified 29 and the account 6 is classified as Sensitive 46, the system 1 will provide a recovered password 2.

After the system 1 generates a recovered password 2, the system 1 will transmit the recovered password 2 to the user 12 using the unique identifier 14. If the unique identifier 14 is an email address 15, the recovered password 2 can be sent via email to the unique identifier 14. If the unique identifier is a phone number 51, the recovered password 2 can be transmitted by an audio phone call 22 or by text message 23. If the unique identifier 14 is a postal address 52, the system may generate a printed document 53 for postal mailing to the user 12. In alternative embodiments, the recovered password 2 may be transmitted to the user 12 though a method that does not use the unique identifier 14 as the delivery address.

In certain embodiments, passwords may be recovered by agents 13. In certain embodiments, agents 13 are third parties other than the system administrator. Examples of agents include employees of contractors, franchisees of the system administrator, physician practices (when the system administrator is a health plan or business associate of a health plan). In certain embodiments, when a user 12 wishes to recover a password 2, the user 12 can contact an agent 13. A user 12 can contact an agent 13 in person, by phone, or by any other means of communication. The user 12 provides his unique identifier 14 to the agent 13. In instances where additional demographic information 31 is needed, the agent 13 can input such information into the system 1 electronically on behalf of the user. In some embodiments, the agent must verify the identity of the user 12 before entering demographic information 31. Verification of the identity of the user 12 can be done by the agent by verifying a photo identification (such as a driver's license), or other identifying documents 55. Alternatively, the agent 13 may attest to the identity of the user if the user 12 is personally known to the agent 13. In some embodiments, the agent 13 may input identifying information into the system 1. Such identifying information includes, but is not limited to, information such as a driver's license number or a scanned image of identifying documents. Once demographic information 31 is provided to the agent 13, and the agent 13 inputs the demographic information 31 into the system 1, the user's 12 unique identifier 14 will be classified as Verified 29. After a user's 12 identity has been established by an agent 13, a password 2 can be obtained. The agent 13 indicates that the user's 12 identity has been established by a computer based interface. The system 1 obtains the password 2 from a pseudo-random number generator 50, a pre-established list, or a non-random algorithm. The system 1 then transmits the recovered password 2 to the agent 13. The agent 13 then gives the recovered password 2 to the user 12. In alternative embodiments, after the agent 13 verifies the identity of the user 12 and requests a recovery password 2, the system 1 may send the recovered password 2 directly to the user 12 by transmitting the recovered password 2 to the unique identifier 14 (when the unique identifier is a phone number, email address, etc.).

In certain embodiments, biometric data 39 can be used by agents to establish identity. In such embodiments, users 12 will be identified by characteristics such as finger prints, retinal scans, or facial recognition. When biometric data 39 is used, a device 54 capable of recognizing such data may be coupled to the system 1. Additional data may be inputted into the system 1 by agents 13.

In some embodiments, recovered passwords 2 are useable for a predetermined period of time. The length of time a password may be valid can be any length of time, including an infinite duration. In some embodiments, the length of time a recovered password 2 remains valid include one hour, two hours, three hours, twelve hours, twenty-four hours, two days, one week, two weeks, one month, two months, and one year. In some embodiments, the duration of time recovered passwords remain valid varies with the sensitivity of the account for which the passwords were issues. In such embodiments, passwords issued for Sensitive 46 accounts will be useable for a shorter duration of time than passwords issued for Non-sensitive accounts 47.

While the invention has been described and illustrated with reference to certain particular embodiments thereof, those skilled in the art will appreciate that the various adaptations, changes, modifications, substitutions, deletions, or additions or procedures and protocols may be made without departing from the spirit and scope of the invention. It is intended, therefore, that the invention be defined by the scope of the claims that follow and that such claims be interpreted as broadly as reasonable.

What is claimed is:

1. A computerized method for recovering a password comprising the steps of:
   receiving an indication, through a computer system, from a user, that a password needs to be recovered;
   receiving a unique identifier, through the computer system, from the user;
   determining a classification of the unique identifier, said classification selected from the group consisting of Invalid, Valid, and Verified, wherein the classification of the unique identifier is determined according to computer readable instructions;
   determining a classification of an account associated with the unique identifier, wherein said classification of the account associated with the unique identifier is Sensitive or Non-Sensitive, and, wherein the classification of the account associated with the unique identifier is determined according to computer readable instructions; and
   informing the user, through the computer system, that the password cannot be recovered when the unique identifier is classified as valid and the account associated with the unique identifier is classified as sensitive.

2. A computerized method for recovering a password comprising the steps of:
   receiving an indication, through a computer system, from a user, that a password needs to be recovered;
   receiving a unique identifier, through the computer system, from the user;
   determining a classification of the unique identifier, said classification selected from the group consisting of Invalid, Valid, and Verified, wherein the classification of the unique identifier is determined according to computer readable instructions;
   determining a classification of an account associated with the unique identifier, wherein said classification of the account associated with the unique identifier is Sensitive or Non-Sensitive, and, wherein the classification of the account associated with the unique identifier is determined according to computer readable instructions; and
   determining the unique identifier is valid and the account associated with the unique identifier is non-sensitive;
   obtaining a recovered password; and
   transmitting the recovered password to the user.

3. The computerized method for recovering a password of claim 2 wherein the recovered password is obtained from a pseudo-random number generator.

4. The computerized method for recovering a password of claim 2 wherein the recovered password is transmitted to the user by email.

5. A computerized method for recovering a password comprising the steps of:

receiving an indication, through a computer system, from a user, that a password needs to be recovered;

receiving a unique identifier, through the computer system, from the user;

determining a classification of the unique identifier, said classification selected from the group consisting of Invalid, Valid, and Verified, wherein the classification of the unique identifier is determined according to computer readable instructions;

determining a classification of an account associated with the unique identifier, wherein said classification of the account associated with the unique identifier is Sensitive or Non-Sensitive, and, wherein the classification of the account associated with the unique identifier is determined according to computer readable instructions; and determining the unique identifier is verified and the account associated with the unique identifier is sensitive;

obtaining a recovered password; and transmitting the recovered password to the user.

6. The computerized method for recovering a password of claim 5 wherein the recovered password is obtained from a pseudo-random number generator.

7. The computerized method for recovering a password of claim 5 wherein the recovered password is transmitted to the user by email.

8. The computerized method for recovering a password of claim 5 wherein the recovered password is transmitted to the user by text message.

9. The computerized method for recovering a password of claim 5 wherein the recovered password is usable for a limited duration of time.

10. A non-transitory computer-readable medium having computer-executable instructions for performing a method for recovering a password comprising:

receiving an indication, through a computer system, from a user, that a password needs to be recovered;

receiving a unique identifier, through the computer system, from the user;

determining a classification of the unique identifier, said classification selected from the group consisting of Invalid, Valid, and Verified, wherein the classification of the unique identifier is determined according to computer readable instructions;

determining a classification of an account associated with the unique identifier, wherein said classification of the account associated with the unique identifier is Sensitive or Non-Sensitive, and, wherein the classification of the account associated with the unique identifier is determined according to computer readable instructions; and informing the user, through the computer system, that the password cannot be recovered when the unique identifier is classified as valid and the account associated with the unique identifier is classified as sensitive.

11. The non-transitory computer-readable medium having computer-executable instructions for performing a method for recovering a password of claim 10 wherein the recovered password is transmitted to the user by text message.

12. The non-transitory computer-readable medium having computer-executable instructions for performing a method for recovering a password of claim 10 wherein the recovered password is useable for limited period of time.

13. A system for recovering a password comprising:

one or more servers, said servers connected to the Internet and holding data including accounts, unique identifiers, and demographic information;

a user interface enabling communication between a user and the servers; and a non-transitory computer-readable medium having computer-executable instructions for performing a method for recovering a password comprising:

receiving an indication, through a computer system, from a user, that a password needs to be recovered;

receiving a unique identifier, through the computer system, from the user;

determining a classification of the unique identifier, said classification selected from the group consisting of Invalid, Valid, and Verified, wherein the classification of the unique identifier is determined according to computer readable instructions;

determining a classification of an account associated with the unique identifier, wherein said classification of the account associated with the unique identifier is Sensitive or Non-Sensitive, and, wherein the classification of the account associated with the unique identifier is determined according to computer readable instructions; and informing the user, through the computer system, that the password cannot be recovered when the unique identifier is classified as valid and the account associated with the unique identifier is classified as sensitive.

14. The system for recovering a password of claim 13 further comprising a pseudo-random number generator coupled to the one or more servers.

15. A non-transitory computer-readable medium having computer-executable instructions for performing a method for recovering a password comprising:

receiving an indication, through a computer system, from a user, that a password needs to be recovered;

receiving a unique identifier, through the computer system, from the user;

determining a classification of the unique identifier, said classification selected from the group consisting of Invalid, Valid, and Verified, wherein the classification of the unique identifier is determined according to computer readable instructions;

determining a classification of an account associated with the unique identifier, wherein said classification of the account associated with the unique identifier is Sensitive or Non-Sensitive, and, wherein the classification of the account associated with the unique identifier is determined according to computer readable instructions; and determining the unique identifier is valid and the account associated with the unique identifier is non-sensitive;

obtaining a recovered password; and transmitting the recovered password to the user.

16. The non-transitory computer-readable medium having computer-executable instructions for performing a method for recovering a password of claim 15 wherein the recovered password is transmitted to the user by text message.

17. The non-transitory computer-readable medium having computer-executable instructions for performing a method for recovering a password of claim 15 wherein the recovered password is useable for limited period of time.

18. A system for recovering a password comprising:

one or more servers, said servers connected to the Internet and holding data including accounts, unique identifiers, and demographic information;

a user interface enabling communication between a user and the servers; and a non-transitory computer-readable medium having computer-executable instructions for performing a method for recovering a password comprising:
  receiving an indication, through a computer system, from a user, that a password needs to be recovered;
  receiving a unique identifier, through the computer system, from the user;
  determining a classification of the unique identifier, said classification selected from the group consisting of Invalid, Valid, and Verified, wherein the classification of the unique identifier is determined according to computer readable instructions;
  determining a classification of an account associated with the unique identifier, wherein said classification of the account associated with the unique identifier is Sensitive or Non-Sensitive, and, wherein the classification of the account associated with the unique identifier is determined according to computer readable instructions; and
  determining the unique identifier is valid and the account associated with the unique identifier is non-sensitive;
  obtaining a recovered password; and
  transmitting the recovered password to the user.

19. The system for recovering a password of claim 18 further comprising a pseudo-random number generator coupled to the one or more servers.

* * * * *